United States Patent [19]

Toya

[11] Patent Number: 5,087,915
[45] Date of Patent: Feb. 11, 1992

[54] SEMICONDUCTOR INTEGRATED CIRCUIT DEVICE WITH ANALOG TO DIGITAL CONVERTER

[75] Inventor: Tatsuro Toya, Tokyo, Japan

[73] Assignee: Hitachi, Ltd., & Hitachi Microcomputer Engineering Ltd., Tokyo, Japan

[21] Appl. No.: 459,531

[22] Filed: Jan. 2, 1990

[30] Foreign Application Priority Data

Jan. 10, 1989 [JP] Japan ................... 01-3504

[51] Int. Cl.⁵ .................... H03M 1/00; H03M 1/12
[52] U.S. Cl. ................................. 341/155; 341/126
[58] Field of Search ............... 341/122, 123, 126, 155, 341/141, 154, 163

[56] References Cited

U.S. PATENT DOCUMENTS

| | | | |
|---|---|---|---|
| 4,117,409 | 9/1978 | O'Brien | 341/126 |
| 4,293,848 | 10/1981 | Cheng et al. | 341/154 |
| 4,318,080 | 3/1982 | Yoshida | 341/126 |
| 4,654,632 | 3/1987 | Yoshida et al. | 341/141 |
| 4,686,507 | 8/1987 | Kessler | 341/163 |
| 4,839,652 | 6/1989 | O'Donnell et al. | 341/123 |
| 4,965,577 | 10/1990 | Baba | 341/155 |

OTHER PUBLICATIONS

Hitachi Original Single Chip Microcomputer "H8/532", Published by Hitachi, Ltd., Aug. 1988, p. 26.

*Primary Examiner*—William M. Shoop, Jr.
*Assistant Examiner*—Helen Kim
*Attorney, Agent, or Firm*—Fay, Sharpe, Beall, Fagan, Minnich & McKee

[57] ABSTRACT

A single-chip microcomputer is comprised of an analog to digital converter, a first external terminal which receives an analog signal which is to be converted by the analog to digital converter, and a second external terminal for receiving a signal indicating an operating condition of the analog to digital converter.

8 Claims, 3 Drawing Sheets

SEMICONDUCTOR INTEGRATED CIRCUIT DEVICE WITH ANALOG TO DIGITAL CONVERTER

BACKGROUND OF THE INVENTION

This invention relates to an analog to digital converter and more particularly to technology which can be effectively applied to a successive approximation type analog to digital converter to be built in a semiconductor integrated circuit in a microcomputer or a peripheral controller.

A successive approximation type analog to digital converter (hereinafter A/D converter) built in a large scale semiconductor integrated circuit for processing data, such as a microcomputer, is comprised of a sampling circuit for an analog signal; a comparison data register for providing a quantizing level for an analog to digital conversion and a digital to analog converter circuit (hereinafter D/A converter) for providing a quantizing level for a digital to analog conversion; a comparator circuit for use in comparing the provided quantizing level with an analog signal level; and a controlling circuit for use in controlling a plurality of the above-mentioned circuits.

In the case of performing an A/D conversion, but not restricted thereto, the most significant bit in the comparison data register is initially set to "1" and all the other bits are initially set to "0". At first, a quantization level which corresponds to the most significant bit "1", i.e., half the full-scale voltage, is given from the D/A converter circuit to the comparator circuit. The comparator circuit compares the quantizing level with a voltage level of a sampled analog signal and discriminates a relationship between their values. In a case where a result of comparison is more than half of the full scale voltage, the most significant bit of the comparison data register is kept at "1". In a case where the result of comparison is less than half of the full scale voltage, the most significant bit in the comparison data register is changed to "0". In this manner, a value for the most significant bit is defined.

In performing a comparison operation for a second bit, a bit lower than the most significant bit (hereinafter second bit) in the comparison data register is set to "1" in the same manner used to determine the most significant bit. A voltage level having a load voltage of the most significant bit (a voltage level of a half of the full scale voltage) overlapped to a quantizing level corresponding to "1" of the second bit (i.e. a voltage level of ¼ of the full scale voltage) is outputted from the D/A converter to the comparator circuit. The comparator circuit compares an output of D/A conversion with a voltage level of the an analog signal. In response to a result of comparison, a value of the second bit is defined as "1" or "0". The operation is repeated down to the least significant bit, thereby a voltage level of the sampled analog signal is converted into a corresponding digital signal and set in the comparator register as digital data.

In this way, the successive approximation type A/D converter compares the voltage level of an input analog signal with the successive quantizing level, so that its conversion action requires a predetermined time. That is, a conversion time of the successive approximation type A/D converter is longer than a conversion time of a parallel approximation type A/D converter.

Due to this fact, when the successive approximation type A/D converter is applied to convert an analog signal into a digital signal, it is not possible to perform a conversion of high accuracy without keeping the analog input signal at a constant level during its conversion period. Therefore, there is provided an A/D converter having a sample and hold function including a hold circuit for use in storing the voltage level of a sampled analog input signal during a comparison period.

An example of literature describing a single chip microcomputer having the successive approximation type A/D is disclosed in the description of Hitachi Original Single Chip Microcomputer "H8/532", page 26 published by Hitachi Ltd. in August of 1988.

The present inventor has studied the sample and hold function for the successive approximation type A/D converter, in particular the successive approximation type A/D converter built in the semiconductor integrated circuit. According to the above study, a voltage level of the analog signal must be accumulated in a stable manner in a holding capacitance.

In order to perform this operation, it is necessary to increase the holding capacitance such that noise generated on the semiconductor substrate caused by stray capacitance of a line to which an analog signal is supplied, a non-desired capacitance generated in the switching element, a disturbance in manufacturing of the element and a variation in potential of the semiconductor substrate, and the like can be substantially ignored. However, if the holding capacitance is increased, a charging time required for charging a voltage level of an analog signal to the holding capacitance is correspondingly increased. If its charging time is not sufficient, its accuracy of conversion is necessarily decreased. In turn, if its charging time is too long, an efficiency of converting operation is decreased and at the same time a level of the input analog signal having a severe variation may not be sampled accurately.

Due to these facts, a holding capacitance value of the successive approximation type A/D converter built in the semiconductor integrated circuit is set to a value within a range where the charging time is not elongated too much and where a certain high accuracy of conversion can be kept. However, the present inventor has also discovered that when performing a digital conversion of an analog input signal having a large variation, the analog input signal might be varied during a charging period for the holding capacitance, resulting in a decrease in the accuracy of conversion.

In addition, since the operation of the A/D converter is determined in response to an operating clock frequency (a system clock) for determining an operating cycle, a charging time of the analog signal with respect to the holding capacitance may also be dependent upon its operating clock frequency. Due to this fact, when the A/D's microcomputer is operated at a relatively low speed in view of its system operation, a charging time of the analog input signal with respect to the holding capacitance is relatively extended. Thus, when the voltage level of an analog input signal having a high potential variation is charged to the holding capacitance, a reduction in the accuracy of conversion of the A/D converter is made more apparent due to a variation of the voltage level of the analog input signal during its charging period.

The A/D converter having no holding function must sample an analog signal every time a comparing operation is carried out. Due to this fact, the accuracy of A/D conversion with respect to an analog input signal having a high potential variation is markedly decreased.

In view of the above fact, the present inventor studied a sample and hold circuit having a high performance at an external part in order to improve the accuracy of an A/D conversion with respect to an analog signal having a large potential variation. However, since the conventional type of A/D converter has no output means for use in outputting a sampling start timing signal, a sampling termination timing signal or a timing signal for informing its sampling period to an external part, the prior art has a problem that the above timing may not be given to the external sample and hold circuit even if a high performance sample and hold circuit is arranged at the external part. In addition, it may not be possible to efficiently inform the A/D converter as to the generation of original analog signal and due to this fact, it may not be possible to provide an easy response to a requirement for controlling its analog signal generating part.

SUMMARY OF THE INVENTION

According to the present invention there is provided an analog to digital converter built in a semiconductor integrated circuit, such as a microcomputer. The analog to digital convertor is provided with means for outputting at least one of a number of strobe signals for use in indicating a sampling start of an analog signal, its termination, or its sampling period to an external terminal of the semiconductor integrated circuit.

According to the above-mentioned means, the strobe signal used to indicate a sampling operation of the analog signal to an external part can be supplied to a high performance sample and hold circuit. The sample and hold circuit is arranged externally in order to improve the accuracy of an A/D conversion with respect to an analog input signal having a high potential variation. The high performance sample and hold circuit is controlled in such a way as it may acknowledge the strobe signal as a sampling timing signal and may sample the analog signal. With this arrangement, an effective utilization of a sampling and holding function at an external part, an improvement in the accuracy of conversion in response to an operating state of the analog to digital converter and an improved controlling characteristic with respect to the analog signal generating means can be accomplished.

It is an object of this invention to provide an A/D converter equipment capable of making an effective utilization of an external sampling and holding function.

It is another object of this invention to provide an A/D converter capable of easily improving an accuracy of conversion in response to an internal operating condition or a state of an analog input signal.

It is still a further object of this invention to provide an A/D converter for realizing a controlling characteristic in respect to the analog signal generating means.

It is yet a further object of this invention to provide a microcomputer having an analog to digital converter built therein and having an external terminal for use in outputting a sampling time for the analog signal to an external part of a chip.

The foregoing and other objects and new features of this invention will become apparent from the description of the specification and the accompanying drawings.

DETAILED DESCRIPTION OF THE PREFERRED EMBODIMENTS

Figure 1:
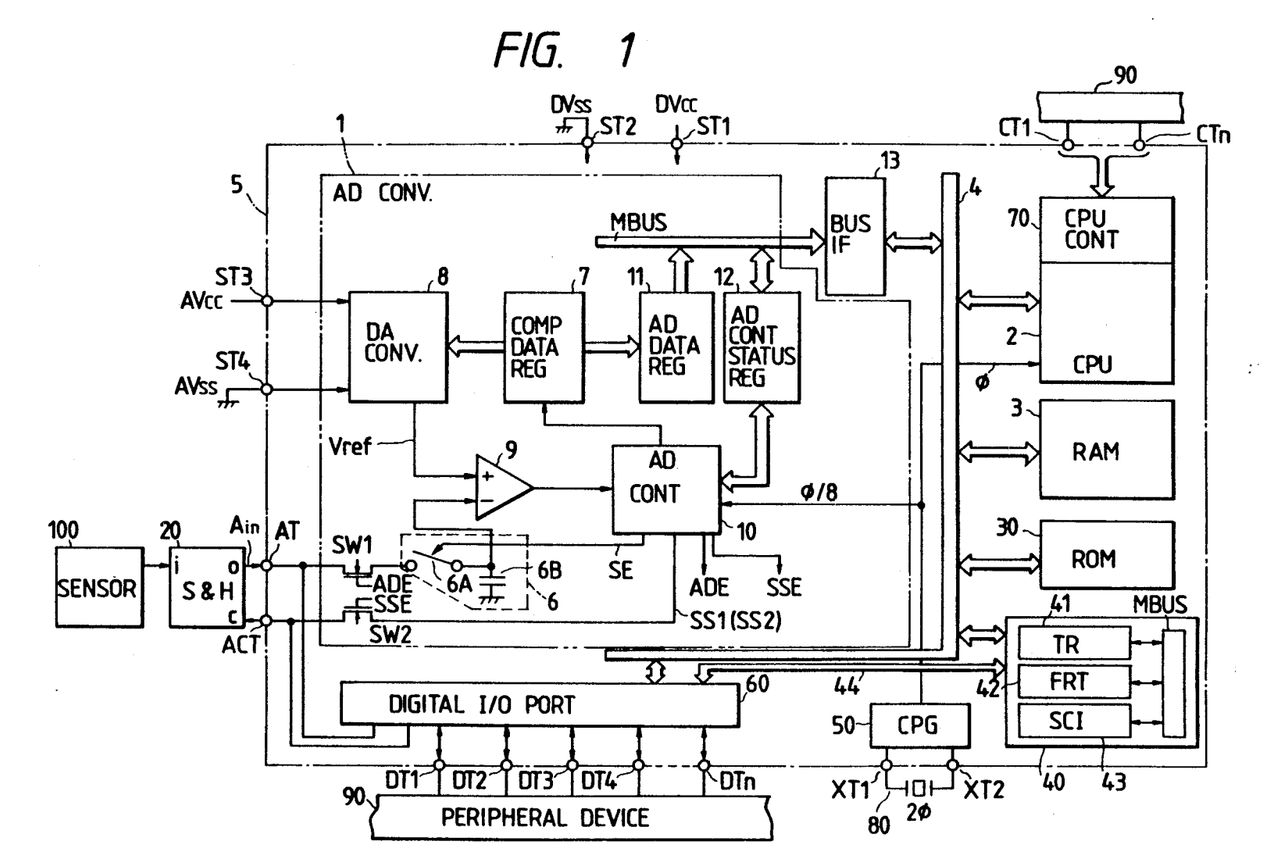
FIG. 1 is a block diagram for showing a single chip microcomputer having a successive approximation type A/D converter having a sampling and holding function built therein an accordance with one preferred embodiment of this invention.

FIG. 1 illustrates a single-chip microcomputer having a successive approximation type A/D converter built therein which is one preferred embodiment of the present invention.

The single-chip microcomputer illustrated in this figure is formed by utilizing a well-known CMOS process or a bipolar CMOS process in a semiconductor substrate of a single crystal silicon and is indicated by the outer dotted line. Accordingly, the microcomputer 5 illustrated in this figure is constituted by N-channel type MOSFETs, P-channel type MOSFETs or a combination of N-channel type MOSFET, P-channel type MOSFETs and NPN-type bipolar transistors.

In addition to the above-mentioned A/D converter 1, the microcomputer 5 includes a central processing unit (CPU) 2, a random access memory (RAM) 3, a read-only-memory (ROM) 30, a built-in peripheral circuit (or an internal peripheral circuit) 40, a clock pulse generator CPG 50, a digital I/O port 60, a control circuit CPU CONT 70 for controlling an operation mode of the CPU 2 and an internal bus 4.

The CPU 2 performs predetermined data processing described in the program stored in the ROM 30. For example, in the case where the program contains the data processing program for the analog signal, the CPU instructs the A/D converter to convert an analog input signal into digital signals and at the same time instructs it to write the converted digital signals into the RAM 3 through the internal bus 4.

The internal peripheral circuit 40 includes, though not restricted specifically thereto, a timer TR 41, a free running timer FRT 42 and a serial communication interface SCI 43. The timer TR 41 is utilized for outputting a pulse signal having any duty ratio to an external part through the digital I/O port 60. The free running timer FRT 42 is utilized for measuring a pulse width of each of the digital signals inputted through the digital I/O port 60. Alternatively, it can be used for measuring a period of an external clock or outputting a signal of any wave form to an external part through the I/O port 60. The serial communication interface SCI 43 is utilized for controlling reception of the serial data from the external part and transmission of the serial data to the external part. In this way, the microcomputer 5 shown in this figure has an improved internal function and can be applied for various data processing systems. The timer 41, free running timer FRT 42 and serial communication interface SCI 43 are controlled by the central processing device 2 via internal bus 4 in such a way as their operations may be applied to the data processing system to be constituted.

A clock pulse generator CGP 50 generates an operating clock $\phi$ (=10 MHz) of CPU 2, an operating clock $\phi/8$ (=10 MHz/8) of the A/D converter and an operating clock (not shown) of the peripheral circuit 40 in response to an oscillating frequency (2$\phi$) of a crystal oscillator 80 connected between the external terminals $XT_1$ and $XT_2$. The CGP 50 includes an oscillator connected to the crystal oscillator element 80 so as to produce a clock signal o having a frequency twice the operating clock (a system clock) of the CPU 2, a frequency divider is used for producing the system clock $\phi$ by dividing the frequency into two segments through the clock 2$\phi$ and a pre-scaler for dividing the system clock $\phi$ into eight segments or for forming the operation clocks ($\phi/2$, $\phi/4$, $\phi/8$, $\phi/16$ . . .) for the internal peripheral circuit 40.

The digital I/O port 60 is arranged between the internal bus 4 and either an external data terminal $DT_1$ or $DT_n$. The digital I/O port 60 is controlled such that the digital data on the internal bus 4 can be outputted to one or more specified external data terminals (DT) so as to control an operation of the external peripheral device 90. Alternatively, the digital data from the external peripheral device 90 can be inputted from one or more specified external terminals (DT) into the internal bus so as to monitor an operating condition of the external peripheral device 90.

The digital I/O port 60 is controlled in such a way as one or a plurality of terminals in the external terminals $DT_1$ to $DT_n$ can be assigned as an exclusive input, an exclusive output or an exclusive input and output terminal for the internal peripheral circuit 40. At the same time I/O port 60 enables transmittance of data between the exclusive terminal and the peripheral circuit 40 through exclusive bus 44. A controlling action of the digital I/O port 60 can be executed by the CPU 2 in accordance with the program stored in the ROM 30.

The control circuit CPU CONT 70 receives a control signal such as a reset signal, an interrupt request signal, a stand-by signal, a mode setting signal and the like from external terminals $CT_1$ to $CT_n$ connected to the external peripheral device 90 in order to control operation of the CPU 2.

The microcomputer 5 includes additional power supply supplying terminals $ST_1$ and $ST_2$ to which a 5 volt power supply voltage DVcc and a 0 volt ground voltage DVss are respectively connected for supplying digital circuits, such as CPU 2, RAM 3, ROM 30, internal peripheral circuit 40, CPG 50 and digital I/O port 60. Additionally, power supply supplying terminals $ST_3$ and $ST_4$ are respectively connected to a reference power supply voltage AVcc and a ground potential AVss for supplying the A/D converter 1.

Still further, the microcomputer 5 has an external terminal (a first terminal) AT to which an analog signal Ain is supplied and an external terminal (a second terminal) ACT to which either a strobe signal SS1 or SS2 is supplied from the A/D converter 1.

The terminal AT is connected to an output terminal 0 of the external sample and hold circuit 20. A control terminal C of the circuit 20 is connected to the terminal ACT so as to receive either the strobe signal SS1 or SS2. In addition, an input terminal i of the circuit 20 receives an original analog signal generated from an analog sensor 100. The external sample and hold circuit 20 performs a sampling action for the original analog signal from the sensor 100 in response to a high level of either the strobe signal SS1 or SS2 inputted to its control terminal C and also performs a holding action. The sample and hold circuit 20 then outputs the analog input signal Ain corresponding to a voltage level of the analog signal held at its output terminal 0 to the terminal AT.

The analog sensor 100, though not specifically restricted thereto, is applied as a hot wire sensor. This hot wire sensor is a kind of air flow sensor, wherein it contains a first heat generating resistor connected in series between a power supply terminal (Vcc) and a ground terminal (GND) and a second resistor element having a specified resistance value. The first resistor element is a variable impedance element, wherein as a flow rate of air is increased, its heating amount is decreased, so that its resistance value is increased and in turn if a flow rate of air is low, its heating amount is increased, resulting in that its resistance value is decreased. The analog output signal is taken out from a connection point between the first resistor element and the second resistor element. As apparent from the foregoing, this analog output signal is set to have a voltage level divided by the first and second resistor elements and in case that a severe variation of a flow rate of air is found, a variation of potential at its voltage level is also severe.

The analog sensor is not limited to the hot wire sensor and a pressure sensor for use in sensing a pressure within a cylinder of an engine mounted on a vehicle, for example, may also be applied.

In a case where the A/D converter 1 is not applied, the external terminals AT and ACT are connected to the digital I/O port 60 in order to provide an effective utilization of the terminals AT and ACT as they may also be used as an input/output terminal for the digital signal. In addition, where the terminal AT receives the analog signal, an impedance of the digital input/output circuit connected to the terminal AT of the digital I/O port 60 is increased so as to prevent the level of the analog signal from being varied.

Although not restricted to, the successive approximation type A/D converter shown in FIG. 1 includes a sample and hold circuit 6 for the analog signal Ain; a comparison data register 7 and a D/A converter circuit 8 for producing a quantizing level for an analog to digital conversion; and a comparator circuit 9 for comparing the quantizing level with a voltage level of a sampled analog input signal. Further included is a data register 11 for holding a comparison result sent from the comparison register 7; a control status register which includes control data which instructs the starting of the operation of an A/D converter, and status data which indicates an operating condition of an A/D converter; a bus interface 13 for interfacing the data register 11 and the control status register 12 to the internal bus 4; and a control circuit 10 for controlling the entire A/D converter.

Figure 2:
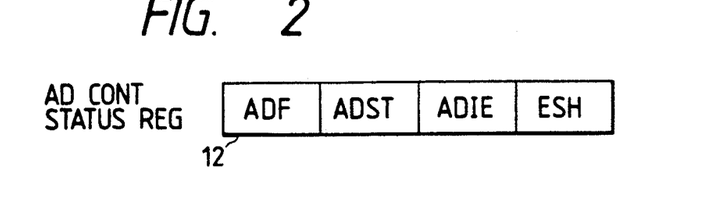
FIG. 2 is an illustrative view for showing a control register 12 shown in FIG. 1.

FIG. 2 illustrates a bit configuration of the control register 12. ADF corresponds to a bit indicating a termination of a converting operation, ADST corresponds to a bit indicating a starting of the converting operation, ADIE corresponds to a bit for indicating an allowance of a request for an interruption caused by a termination of the converting operation, and ESH corresponds to a bit for indicating a presence or a non-presence of an external sample and hold circuit. Accordingly, the bits ADF, ADST and ADIE are applied to a memory circuit for storing an operating condition of the A/D converter and the bit ESH is used by a memory circuit for storing the external state of the microcomputer 5.

The D/A converter circuit 8 (FIG. 1) has a resistor string circuit in which when it performs an analog conversion of 8 bits digital data, for example, 256 resistor elements having the same resistance value are connected in series and the switch elements are connected in a string format in an order from the junction node of each of the resistor elements. The switch elements in the resistor string circuit are switch controlled in response to the digital data given from the comparison data register 7, thereby the D/A converter 8 generates a quantizing level Vref weighted by a value of the digital data. This quantizing level Vref is supplied to the comparator circuit 9 which is comprised of an operation amplifier.

The sample and hold circuit 6 contains a sampling switch 6A for keeping its ON state only for the asserting period of a sampling signal SE and inputting an analog signal Ain, and a holding capacitance 6B for storing a voltage level of the analog signal Ain supplied through this sampling switch 6A. A capacitance value of this holding capacitance 6A is about 8 pF. When an operation of the A/D converter 1 is started, it is asserted for a predetermined period of time prior to its successive approximation operation.

Operation of the A/D converter 1 is started through a writing in of data (for example "1") for instructing a starting of operation of the A/D converter from the central processing device 2 into the A/D converting start bit ADST of the control status register 12. The control circuit 10 generates an enable signal ADE to cause a channel switch MOSFET SW1 arranged between the external terminal AT and the sampling switch 6A to be turned ON in response to a writing of "1" in the A/D conversion start bit ADST. In addition, the control circuit 10 produces a strobe enable signal SSE causing an N-channel switch MOSFET SW2 to be turned ON. This is done in order to supply either a strobe signal SS1 or SS2 to the external terminal ACT if a data "1" indicating that there is an external sample and hold circuit present as indicated by the bit ESH of the control status register 12.

As described above, the operations of the successive approximation type A/D converter circuit 1 and the central processing device 2 are synchronized with each of the operation clocks $\phi/8$ and $\phi$, respectively. Accordingly, a conduction period of the sampling switch 6A corresponding to an asserting period of the sampling signal SE (i.e. a sampling period of the analog signal Ain) is defined as a predetermined number of cycles of the operating clock signal $\phi/8$, for example, 63 cycles. The predetermined number of cycles is defined as the number of cycles such that a sufficient sampling time can be attained in response to a value of capacitance of the holding capacitance 6B. Actually, the predetermined number of cycles is defined in advance in response to the logic of the control circuit 10. In other words, when the operating clock $\phi$ is 10 MHz and the holding capacitance 6B is 8 pF, it is preferable to have the sampling time of about 4$\mu$s and further the number of cycles corresponding to the sampling time (4$\mu$s) is set to have a value of 63 cycles.

A voltage of the analog signal stored in the holding capacitance 6B is supplied to the comparator circuit 9. The comparator circuit 9 compares its sampled voltage level with the quantizing level Vref and supplies its result to the control circuit 10. The control circuit 10 corrects a corresponding bit of the comparator data register 7 as required in response to a result of comparison and performs a next comparing operation.

Upon completion of the comparing operation from the most significant bit to the least significant bit, the comparison data is supplied to the data register 11. Then, the control circuit 10 clears the A/D conversion start bit ADST of the control status register 12 to "0". The control circuit 10 writes the data "1" indicating a completion of the A/D conversion into an A/D conversion end flag ADF of the control status register 12. In addition, the control circuit 10 supplies an interruption signal for informing of the termination of the A/D conversion to the central processing device 2 when data indicating an allowance of a request for interruption caused by the termination of the A/D converting operation is kept at the interrupt enable bit ADIE. With this arrangement, the central processing device 2 controls the A/D converter 1 and the bus interface 13 in such a way as the digital data held in the data register 11 may be taken into the internal bus 4 through the module bus MBUS and the bus interface 13.

The successive approximation type A/D converter 1 of the preferred embodiment is constructed such that either a sampling strobe signal SS1 for instructing a sampling start timing of an analog signal Ain through the sample and hold circuit 6 or a sampling strobe signal SS2 for indicating a sampling period, may be outputted from the control circuit 10 to the external part of the microcomputer 5 through the external terminal ACT.

Figure 3:
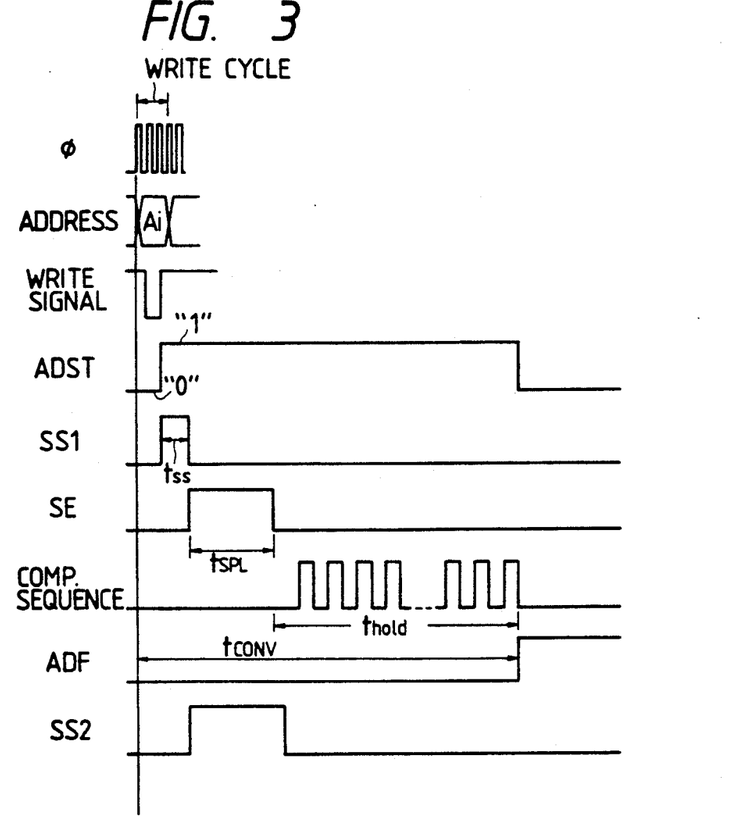
FIG. 3 is an illustrative view for showing an operation of an A/D converter shown in FIG. 1.

FIG. 3 is an operating waveform for indicating an operation of the A/D converter of the microcomputer 5. The operation of the A/D converter 1 will be described with reference to FIG. 3. A case where the bit ESH of the control status register 12 is set to "1" by CPU 2 will be described.

The CPU 2 executes a data processing operation in response to a predetermined data processing program stored in ROM 30. If the analog data processing program is present within the data processing program, the CPU 2 produces an address signal Ai indicating the control status register 12 is in synchronism with the operating clock $\phi$ in order to access the A/D conversion start bit ADST. In addition, the CPU 2 sets a selective low level of the write signal in order to show the writing operation and sets the A/D conversion start bit ADST to "1". A writing cycle of the CPU 2 above is carried out within three periods of the operating clock $\phi$, i.e. three states (three cycles).

The control circuit 10 generates the enable signal ADE, and the strobe enable signal SSE in order to turn ON the switch MOSFETs SW1 and SW2 in response to the fact that the A/D conversion start bit ADST is set to "1". Additionally, a pulse-like strobe signal SS1 is generated indicating a sampling time to the high performance sample and hold circuit 20. The external sample and hold circuit 20 receives the strobe signal SS1 supplied to the external terminal ACT through a source drain path of the switch MOSFET SW2 at its control terminal C. The analog signal supplied from the analog sensor 100 is stored at the sample and hold circuit's 20 input terminal i in an internal holding capacitance. The above occurring in synchronism with a high level of the strobe signal SS1. That is, the external sample and hold circuit 20 stores a voltage level of the analog signal to its holding capacitance during a high level period of the strobe signal SS1. In other words, the sampling time of the high performance external sample and hold circuit 20 is set to a time tss which is a high level of the strobe signal SS1.

Accordingly, even if the analog signal outputted from the sensor 100 is rapidly varied, the high level period tss of the strobe signal SS1 is shortened, so that the analog signal from the sensor 100 may be assumed to be a constant value. In turn, the external sample and hold circuit 20 can make an accurate accumulation of the voltage of an analog signal supplied to it even if its sampling time is shortened.

The control circuit 10 causes the sampling signal SE to be varied at a high level for a predetermined period of time in order to close the sampling switch 6A in response to a variation of the strobe signal SS1 to a low level. During a high level period of this sampling signal SE (i.e. during a sampling time $t_{SPL}$) the holding capacitance 6B is supplied with a voltage level of an analog signal having less variation stored in a holding capacitance of the external sample and hold circuit 20. The storage capacity 6B is supplied through the external terminal AT and the source drain path of the switch MOSFET SW1 thus storing the voltage level of the analog signal at 6B.

Thereafter, the A/D converter 1 executes a comparing operation sequence in order to convert a voltage level stored in the holding capacitance 6B into digital signals of a plurality of corresponding bits. In this figure, a reference symbol $t_{hold}$ indicates a holding time in which the holding capacitance 6B holds the voltage level of the analog signal.

The control circuit 10 detects a termination of the A/D converting operation, clears the value of the A/D conversion start bit ADST from "1" to "0" and sets the A/D conversion end flag ADF from "0" to "1". A reference symbol $t_{CONV}$ in this figure indicates a converting time required for performing one A/D conversion. The converting time is 13.4μs.

The control circuit 10 generates an interrupt signal for the CPU 2 if the interrupt enable bit ADIE is set to "1".

A case in which the strobe signal SS1 is outputted has been described above. However, the strobe signal may be of a type illustrated by strobe signal SS2. This strobe signal SS2 is set to a high level in synchronism with a rising of the sampling signal SE and to a low level during a time from a descending of the sampling signal SE to a starting of the comparing operation sequence. This signal is used to indicate a sampling period of the internal sample and hold circuit 6.

If a voltage of the analog signal Ain is charged in the holding capacitance 6B at a sampling time which is determined unconditionally with reference to a configuration of the control circuit 10 and a frequency of the operating clock φ/8, a variation of the level in the input analog signal Ain during a charging period may disrupt and influence its charging level causing a decrease in the accuracy of A/D conversion. Therefore, it is preferable to arrange a high performance sample and hold circuit 20 at an external part and to supply the analog signal Ain to the successive approximation type A/D converter 1 through the sample and hold circuit. In this case, the sample and hold circuit 20 must be informed of the sampling time of the sample and hold circuit 6 built in the A/D converter 1.

Thus, in the present invention, the sample and hold circuit 20 acknowledges a sampling time of the successive approximation type A/D converter 1 in response to a variation of the rising of the sampling strobe signal SS1 or SS2. The sample and hold circuit 20 can sample the analog signal in a shorter time than that of the sample and hold circuit 6. Accordingly, since an influence of a variation of the level of the input analog signal is not applied so much to a charging level of the sample and hold circuit 20, this charging level is received by the sample and hold circuit 6. In this manner, the A/D conversion can be carried out with high accuracy without receiving any influence due to the variation of the level of analog signal even if the analog signal from the sensor 100 to be converted is varied during a sampling period of the sample and hold circuit 6.

Although in the above-mentioned preferred embodiment, the operating clock φ is applied at 10 MHz, if the microcomputer 5 is operated at a low speed in synchronism with the operating clock φ having a relative low frequency in its system operation, an asserting period of the sampling signal SE, i.e. a charging time of the analog signal Ain with respect to the holding capacitance 6B is also relatively extended, resulting in that the charging level for the holding capacitance 6B may easily be influenced by a variation in level of the analog signal Ain. Also in this case, in the same manner as described above, it is effective to perform a controlling operation for the sample and hold circuit 20 arranged outside the microcomputer 5 by applying the sampling strobe signal SS1 or SS2.

Although the invention has been described wherein a variation of the analog signal from the sensor 100 is rapidly applied, the microcomputer 5 can be efficiently applied even when a variation of the analog signal from the sensor 100 is not severe. In this case, the external sample and hold circuit 20 is not needed and an output of the strobe signal SS1 or SS2 is not required. Accordingly, if the bit ESH of the status register 12 is set to "0", the signal SSE is not generated, so that the switch MOSFET SW2 is turned OFF. Due to this fact, the strobe signal SS1 or SS2 may not be supplied to the external terminal ACT.

Figure 4:
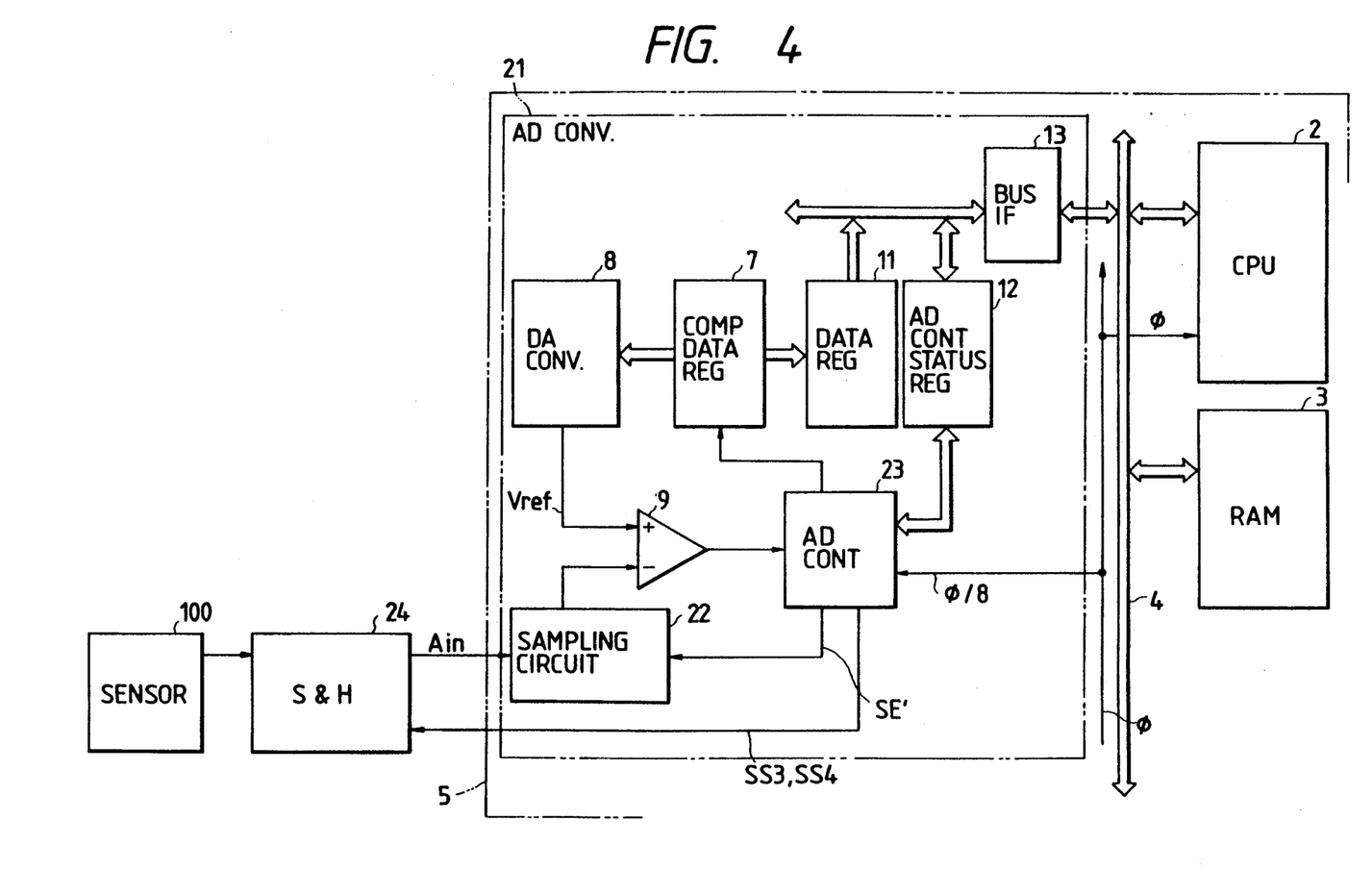
FIG. 4 is a block diagram for showing a successive approximation type A/D converter not storing a sampling and holding function of another preferred embodiment of this invention.

FIG. 4 illustrates another successive approximation type A/D converter of another preferred embodiment of the present invention. The successive approximation type A/D converter 21 shown in this figure has a sampling circuit 22 in place of the sample and hold circuit 6 in the successive approximation type A/D converter 1 shown in FIG. 1.

The A/D converter 21 is operated such that a comparing operation sequence is carried out so as to perform a comparing operation in sequence every time the analog input signal Ain is sampled under control of the control circuit 23. Other configurations are assumed to be the same as that of the preferred embodiment shown in FIG. 1. That is, FIG. 4, shows a schematic illustration of this preferred embodiment.

The successive approximation type A/D converter 21 of the preferred embodiment is operated such that a sampling strobe signal SS3 instructing an initial sampling start time of an analog signal Ain through the sampling circuit 22 or a sampling strobe signal SS4 indicating a period substantially corresponding to a period ranging from an initial sampling time to a last sampling time, is outputted from the control circuit 23 to the external part of the microcomputer 5.

Figure 5:
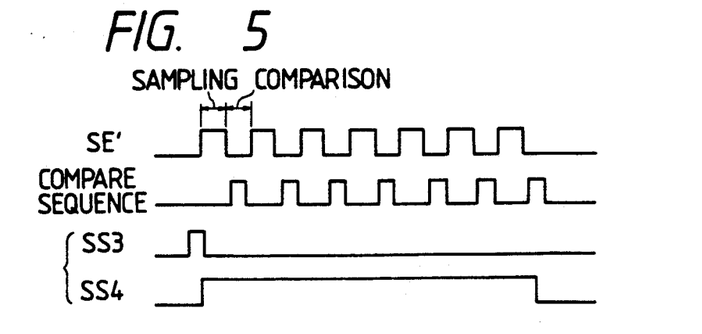
FIG. 5 is an illustrative view for showing an operation of an A/D converter shown in FIG. 4.

As shown in FIG. 5, although the sampling strobe signal SS3 is not specifically restricted thereto, a pulse-like assert variation is applied just after the A/D conversion start bit is enabled. Although not specifically restricted, the sampling strobe signal SS4 is assert varied only for a period which corresponds to a starting time from the assertion of a sampling signal SE' to a comparing operation for the least significant bit. Although it may be applicable that both sampling strobe signals SS3 and SS4 are outputted to the external part, either one of them in the preferred embodiment in FIG. 4 is outputted to the external part.

Since the A/D converter 21 having no holding function as shown in FIG. 4 must sample an analog signal Ain every time a comparing operation is carried out, the accuracy of the A/D conversion with respect to the analog signal Ain having a substantial variation is remarkably reduced. In this case, the sample and hold circuit 24 is arranged at an external part of the microcomputer 5 in the same manner as that of the preferred embodiment above. The sampling strobe signals SS3 and SS4 are applied and the analog signal is held in the sample and hold circuit 24. An analog signal is sampled by the sample and hold circuit 24 for a specified period of time, for example, only a period ranging from a variation of the rising of each of the sampling strobe signals SS3 and SS4 to a high level assertion period of the sampling strobe signal SS3 and its sampling level is held up to a next variation of the assertion of the sampling strobe signal and then this held voltage is given to the sampling circuit 22.

Accordingly, the successive approximation type A/D converter 21 has a high accuracy of conversion with respect to an analog signal having a high variation in the same manner as that of the successive approximation type A/D converter 1 having a sampling and holding function. This is true even if the successive approximation type A/D converter 21 itself has no holding function. This is achieved by giving its operating condition to the external sample and hold circuit 24 through the sampling strobe signals SS3 and SS4.

According to the preferred embodiments above, the following actions and effects can be attained.

(1) The holding capacitance 6B built in the A/D converter included in the microcomputer is set such that a high accuracy of conversion may be kept within a range not extending a charging time. This is accomplished in view of the fact that the holding capacitance is increased to such a degree as stray capacitance of a line or parasitic capacitance of a switch element, a disturbance of manufacturing and noise of a potential variation in a semiconductor substrate may be substantially ignored. It is further accomplished in view of the objectives that an increased charging time with respect to the holding capacitance will not decrease the efficiency of a comparing operation or may cause an input analog signal having a high variation to be accurately sampled.

Accordingly, in a case where an input analog signal is varied during a charging period for the holding capacitance and the accuracy of conversion is decreased in order to make a digital conversion of an input analog signal having a substantial variation, the successive approximation type A/D converter 1 may output the sampling strobe signal SS1 for instructing a start of the sampling time, or a sampling strobe signal SS2 indicating a sampling time to the external part of the microcomputer 5. Therefore, a high performance sample and hold circuit 20 for use in sampling and holding an analog signal to be converted under an acceptance of this signal at the external part is provided. This results in that even if a level of the analog signal to be converted is varied during a sampling period through the internal sample and hold circuit 6, any influence caused by that variation may be decreased and a highly accurate A/D conversion can be carried out.

(2) In the case where the microcomputer 5 is operated at a low speed in synchronism with an operating clock CLK with a relative low frequency, an asserting time of the sampling signal SE, (i.e. a charging time of an analog signal Ain) with respect to the holding capacitance 6B is also relatively extended and it may easily be influenced by a variation of the level of the analog signal Ain. However, even in this case, in the same manner as that of (1) above, the sampling strobe signals SS1 and SS2 are applied to enable an analog signal level to be charged in the sample and hold circuit 20 arranged at the external part of the microcomputer 5. With this arrangement, even if the analog signal to be converted is varied in its level during a sampling period through the internal sample and hold circuit 6, an influence of its variation may not be applied and highly accurate A/D conversion can be carried out.

(3) Since the A/D converter 21 having no holding function must sample the analog signal Ain every time a comparing operation is carried out, the accuracy of A/D conversion with respect to the input analog signal having a high variation is greatly decreased. However, since the successive approximation type A/D converter 21 may inform its operating condition to the external sample and hold circuit 24 by using the sampling strobe signals SS3 and SS4, even if the successive approximation type A/D converter 21 itself has no holding function, it may have a high accuracy of conversion with respect to the analog signal having a high variation in the same manner as that of the successive approximation type A/D converter 1 having a sampling and holding function.

Although the invention invented by the present inventor has been practically described, it is apparent that the present invention is not limited to the foregoing description and various modifications can be made without departing from its scope.

For example, the D/A converter built in the successive approximation type A/D converter is not limited to the above-mentioned configuration having the resistor string circuit therein described in the preferred embodiments and it may be varied to such a configuration as one having a ladder resistor network weighted in response to each of the quantizing levels. As its resistor, ON resistor or OFF resistor of a transistor and a polysilicon resistor may be utilized and an external resistor may also be utilized.

The sampling strobe signal is not limited to the above-mentioned preferred embodiment, but if the signal is one capable of indicating a state of an A/D converting operation to an external part, its asserting timing or an asserting period may freely be varied. For example, in case of the preferred embodiment shown in FIG. 1, the sampling signal Se may be outputted to the external part as the sampling strobe signal.

Although the foregoing description relates to a case in which the present invention is applied to the successive approximation type A/D converter built in the data processing LSI such as a microcomputer which is a field of the background of the present invention, the present invention is not limited to it and it can also be applied to a counting type A/D converter. The present invention may be applied to one having a condition in which at least A/D converted state can be directly outputted to the external part of the chip.

Some typical effects of the present invention disclosed in this patent application are as follows.

That is, in the analog to digital converter built in the semiconductor integrated circuit, a strobe signal indicating at least one of a sampling start, termination of the analog signal or its duration period is outputted to the external part, so that the present invention has an effect of providing an effective utilization of the sampling and holding function at the external part. In addition, the present invention has an effect to easily improve the accuracy of conversion in response to a condition of an internal operation and a state of an input analog signal. Further, the present invention has an effect that a controlling characteristic for a source of generating an analog signal can be realized.

In particular, when an operation of the analog to digital converter is set in synchronous with an operating clock of the central processing device, or when a charging time in respect to an internal holding capacitance for holding a voltage level of an input analog signal is dependent upon the frequency of the operating clock, an influence of the accuracy of A/D conversion under a set condition of its operating clock frequency may easily be reduced.

What is claimed is:

1. In a single-chip microcomputer including a central processing unit coupled to an analog to digital converter which converts an analog signal into digital data, the analog to digital converter having a control register for controlling an operation of the analog to digital converter, an internal sampling circuit for sampling the analog signal to be converted, a converting circuit for providing a converting operation for converting the analog signal to the digital data and a data register for storing the digital data which is to be provided to the central processing unit, the control register of the analog to digital converter comprising:

a first control bit for controlling a start of the converter operation of the analog to digital converter, the first control bit set in the control register by the central processing unit when conversion of the analog signal to digital data is required;

a second control bit for indicating a completion of the converting operation of the analog to digital converter;

a third control bit for controlling an interrupt request to the central processing unit; and a fourth control bit having a first state and a second state, selectively determined by the central processing unit, where the first state enables use of both an external sample and hold circuit and the internal sampling circuit, and the second state enables use of the internal sampling circuit.

2. The control register according to claim 1, wherein the second control bit is set in the control register by the converting circuit.

3. The control register according to claim 1, wherein the third control bit has a first state and a second state, selectively determined by the central processing unit, where the first state thereof enables the interrupt request to the central processing unit, and the second state thereof disables the interrupt request to the central processing unit.

4. The control register of the analog to digital converter according to claim 1, wherein the converting circuit provides a first control signal for controlling the internal sampling circuit and a second control signal for controlling the external sampling and holding circuit when the fourth control bit is in the first state, and wherein the converting circuit provides the first control signal when the fourth control bit is in the second state.

5. The control register of the analog to digital converter according to claim 4, wherein the second control signal is a strobe signal for indicating at least one of a sampling start, termination and period of an analog signal with respect to the internal sampling circuit.

6. A one-chip microcomputer for use with, an analog sensor for generating an analog signal, and
an external sample and hold circuit coupled to receive the analog signal and for sampling and holding the analog signal in response to activation,
the one-chip microcomputer comprising:

a central processing unit; and an analog to digital converter coupled to the central processing unit for converting the analog signal held by the external sample and hold circuit into digital data, the analog to digital converter having a converting circuit for converting the analog signal into the digital data, a control register for controlling an operation of the analog to digital converter, and a data register for storing the digital data which is to be provided to the central processing unit, wherein the control register includes a control bit having a first state and a second state, selectively determined by the central processing unit, where the first state enables the external sample and hold it, and the second state disables the external sample and hold circuit, and wherein the analog to digital converter provides a control signal to the external sample and hold circuit when the control bit is in the first state so as to activate the external sample and hold circuit.

7. The one-chip microcomputer according to claim 6, wherein the converting circuit includes;

a digital to analog converter for generating a quantizing level for analog to digital conversion, and a comparator circuit for comparing the quantizing level with a voltage level of the analog signal to form the digital data to be stored by the data register.

8. The one-chip microcomputer according to claim 7, wherein the control signal is a strobe signal for indicating at least one of a sampling start, termination, and period of the analog signal.

* * * * *

UNITED STATES PATENT AND TRADEMARK OFFICE
CERTIFICATE OF CORRECTION

PATENT NO. : 5,087,915

DATED : February 11, 1992

INVENTOR(S) : Tatsuro Toya

It is certified that error appears in the above-identified patent and that said Letters Patent is hereby corrected as shown below:

Claim 6, column 14, line 40, delete "it" and substitute therefor --circuit--.

Signed and Sealed this

Twentieth Day of April, 1993

Attest:

MICHAEL K. KIRK

*Attesting Officer*   Acting Commissioner of Patents and Trademarks